US010450498B2

(12) United States Patent
Dewalt et al.

(10) Patent No.: US 10,450,498 B2
(45) Date of Patent: Oct. 22, 2019

(54) HEAVY OIL MODIFICATION AND PRODUCTIVITY RESTORERS

(71) Applicants: Petro Motion Inc., Calgary, Alberta (CA); Christy Lee Dewalt, Fox Creek (CA); Dianne Elizabeth Duff, Fox Creek (CA)

(72) Inventors: Christy Lee Dewalt, Fox Creek (CA); Dianne Elizabeth Duff, Fox Creek (CA)

(73) Assignee: PetroMotion Inc., Calgary (CA)

(*) Notice: Subject to any disclaimer, the term of this patent is extended or adjusted under 35 U.S.C. 154(b) by 0 days.

(21) Appl. No.: 15/101,099

(22) PCT Filed: Dec. 2, 2014

(86) PCT No.: PCT/CA2014/051156
§ 371 (c)(1),
(2) Date: Jun. 2, 2016

(87) PCT Pub. No.: WO2015/081433
PCT Pub. Date: Jun. 11, 2015

(65) Prior Publication Data
US 2016/0298020 A1 Oct. 13, 2016

Related U.S. Application Data

(60) Provisional application No. 61/910,740, filed on Dec. 2, 2013.

(30) Foreign Application Priority Data

Jun. 18, 2014 (CA) ...................................... 2854614

(51) Int. Cl.
F17D 1/17 (2006.01)
C09K 8/524 (2006.01)
(Continued)

(52) U.S. Cl.
CPC .............. *C09K 8/524* (2013.01); *C10G 1/045* (2013.01); *C10G 29/20* (2013.01); *C10G 33/04* (2013.01);
(Continued)

(58) Field of Classification Search
CPC ......................................................... F17D 1/17
(Continued)

(56) References Cited

U.S. PATENT DOCUMENTS 4,781,819 A * 11/1988 Chirinos ................ C10G 21/28
208/188
7,841,408 B2 * 11/2010 Vinegar .................. E21B 36/04
166/272.1

(Continued)

FOREIGN PATENT DOCUMENTS

| CA | 2 640 914 A1 | 3/2009 |
| CA | 2 769 356 A1 | 8/2012 |

OTHER PUBLICATIONS

International Search Report and Written Opinion for corresponding International Application No. PCT/CA2014/051156 dated Feb. 12, 2015.

(Continued)

*Primary Examiner* — Ellen M McAvoy
(74) *Attorney, Agent, or Firm* — Renner, Otto, Boisselle & Sklar, LLP

(57) ABSTRACT

A hydrocarbon based fluid additive which reciprocally can be added to either condensate diluent or heavy oil, such as in situ, mined oils sands or crude oils, to form a less viscous whole fluid.

14 Claims, 2 Drawing Sheets

(51) Int. Cl.
*C10G 29/20* (2006.01)
*C10G 33/04* (2006.01)
*C10G 1/04* (2006.01)
*C11D 7/50* (2006.01)

(52) U.S. Cl.
CPC .............. *C11D 7/5027* (2013.01); *F17D 1/17* (2013.01); *C10G 2300/302* (2013.01); *C10G 2300/308* (2013.01); *C10G 2300/802* (2013.01)

(58) Field of Classification Search
USPC ....................................................... 585/1, 16
See application file for complete search history.

(56) References Cited

U.S. PATENT DOCUMENTS

| | | | | |
|---|---|---|---|---|
| 8,844,639 B2* | 9/2014 | Gupta | .................... | C09K 8/592 166/272.3 |
| 8,920,636 B2* | 12/2014 | Kift | ......................... | C08K 5/01 208/390 |
| 9,550,936 B2* | 1/2017 | Mazyar | .................... | C09K 8/58 |
| 2009/0000664 A1* | 1/2009 | Perry | ........................ | F17D 1/17 137/2 |
| 2010/0089800 A1* | 4/2010 | MacDonald | .............. | B03B 5/28 208/390 |
| 2015/0090641 A1* | 4/2015 | Schlosberg | ............ | C10G 11/05 208/390 |

OTHER PUBLICATIONS

Crude Quality Data Summary, Suncor Synthetic A, Batch OSA-633, Jun. 24, 2011.

Crude Quality Data Summary, Suncor Synthetic A, Batch OSA-804, Dec. 26, 2011.

Crude Quality Data Summary, Syncrude Sweet Premium, Batch SSP-897, Oct. 18, 2011.

\* cited by examiner

HEAVY OIL MODIFICATION AND PRODUCTIVITY RESTORERS

This application is a national phase of International Application No. PCT/CA2014/051156 filed Dec. 2, 2014 and published in the English language, which claims priority to U.S. Provisional Application No. 61/910,740 filed Dec. 2, 2013 and Canadian Application No. 2,854,614 filed Jun. 18, 2014. Each of which is incorporated herein by reference in its entirety.

FIELD OF THE INVENTION

This invention relates to compositions for enabling heavy crude oil to flow in pipelines. The compositions can also be used to rehabilitate or open up pipeline systems with restricted flow.

BACKGROUND

In North America today pipeline construction is not keeping up with expansion of oils sands mining, SAGD projects and other heavy oil extraction techniques. Currently producers use condensate and light oils (diluent) gathered from western Alberta oil fields to dilute the heavy crude oil so that is will meet pipeline specifications and ultimately flow as freely in the pipelines as Western Canadian Select. Sources of the diluents include the Beaver Hill Lakes, Bigstone, Devon, Unicol, Gold Creek, Pass Creek, Tony Creek, Snipe Lake, Obed and plays such as the Montney plays, Duvernay plays and other fields. One clear reaction of increased heavy oil prices is that the "light" condensate oil supply is becoming gradually heavier due to the economic advantages drillers are experiencing from producing heavy oils. This western Alberta industry swing from production of 680 kg per $m^3$ oil to heavier 800 plus kg per $m^3$ specific gravity ultimately means less effective diluent which industry wide translates into greater dilution at a greater cost.

The diluents currently used are from routine bulk production facilities and its composition, although monitored and regulated, is not specifically designed to reduce viscosity in specific oils. Chemicals, polymers and DRAs are used in pipelines to try and get oil to flow but generally they cause fouling of upstream processes, process equipment and vessels, specifically where heat or pressure is used to refine or separate product. Many polymers and chemicals are used to clean vessels but many are water based and cause emulsion problems in pipelines and process vessels.

Heavy oil producers are currently using approximately one barrel of condensate for the transportation and upgrading of two barrels of heavy or very heavy oil. With the oil sands production projected to climb from the current 1.8 million barrels of oil in 2013 to an estimated 5.3 million barrels by 2020, this would mean an increased usage of 1.2 million barrels of condensate diluent. This predicted steep increase in demand for light oils has and will continue to make diluents a sought after commodity. Although industry groups have developed elaborate extraction processes, mechanical processes and transportation systems focused on the recycling of these diluent hydrocarbons, the oil industry as a whole has not yet escaped the high cost of recycled transportation or the inevitable high percentage losses that happen during the refining process. The amount of diluent present and the corresponding costs depress oil pricing incrementally.

Often consumers and financial marketers think of crude oil as a single element, like that of gold, or as separate brands, but in fact oil is a collection or spectrum of different molecules. Oil removed from oil sands and other bitumen operations contain several components including carbon, sulfur, oxygen, hydrogen, water, acids, bases, olefins, cycloaromatics, and salts. Carbon chains can range in length from single carbons to long chain hydrocarbons in excess of 150 carbons. Oil is a dynamic fluid which is constantly evolving in reservoir. Crude oils in separate reservoirs are as unique as fingerprints and are in unique stages of decomposition, more specifically understood as slow thermal maturation. The very elements and paramagnetic species that make up the oil also act as catalysts and radicals to decompose it into a simpler shorter chains, which creates a more volatile product. The most dense and viscous oils contain asphaltenes that form highly stable nanoparticles within oil due to the types of bonding (acid base interactions, hydrogen bonding, coordination complexes, associated molecular groups and aromatic stacking) that they undergo. These large highly stable molecules ultimately can seal up reservoir seams, impede pipes and facilities and ultimately impede flow in the large continental pipelines.

Once the nature of the specific heavy oil is understood it can be considered in mathematical context with its condensate diluents. Formulations that meet specified pipeline specifications and ultimately yield highly effective formulas or safer benzene free alternatives are most advantageous.

Diluent is added to the heavy oils to reduce viscosity but there has also been industrial usage of polymers or other elemental or surfactant based compounds to achieve viscosity benefits. Generally these compounds are known as drag reducing agents (DRA's). This general technique of adding non-like compounds, however, is best described as "chemical warfare". These chemical cocktails can interact in pipes and processing facilities, corroding pipelines, vessels sometimes destroying compressors, fouling process towers, pumps and large scale production equipment. This warfare leads to pipeline integrity and corrosion issues which are ultimately precursors to pipeline failures and environmental damage.

Using "like" chemicals in pipelines ultimately means less chemical interactions in pipelines and less chemical precipitation in process equipment down line. These products may also be useful in the preparation of pipelines for smart pigging or for re-establishing flow in lines restricted by heavy oil. Ultimately reduced corrosion and better more effective preventative maintenance monitoring information means less down time for the pipeline, upgrading and refining systems and in turn most certainly equates to more oil shipped to be made into more final product with less environmental impact.

Currently producers in Alberta are adding between 6% and 33% diluent to their heavy production oils in order to get them to flow and meet pipeline specifications. This means that these pipelines have 6-33% less oil in them than they could otherwise. When oil isn't being shipped through the pipeline it is being hauled in trucks or shipped in overland train cars. Shipping such as this is less cost effective than pipelines and also has more environmental risk, which translates into greater risk to the public. The public is showing increased concern regarding transportation of heavy oil through populated areas and environmentally sensitive areas. Recent oil platform failures, train derailments and pipeline corrosion failures have been gaining media attention. As oil production in northern Alberta ramps up to meet continental needs, proposals to simultaneously increase the size of pipeline transportation systems have been slowed. This means that with every month there are more trains and more trucks transporting crude oil across and through our public infrastructure. The use of excessive amounts of diluent is wasteful, uneconomical, produces excess environmental footprint and ultimately wastes a non-renewable resource.

Intercontinental transport of heavy oil as undiluted bitumen is also gaining favor as it has proven to have increased cost benefits to some producers. Although this has an economic benefit in that 30% condensate diluent is not added, it does not have the volume of impact that would be intuitively believed. Tank cars are loaded with heated heavy oil and then pulled by diesel train engine to the southern or central US where they are unloaded. When they are unloaded by refineries they are drained to the extent possible. However, oil that cooled on the walls of the tank cars or was in contact with the bottom of the car becomes so viscous that it cannot be removed. Few southern refineries have heated unloading facilities to remove this viscous oil. Thus one third full tank cars are returned north to refill. This wasteful cycle is repeated until the cars are finally purged of their solidified oil. This is a very inefficient use of transportation having a high environmental toll. Using a viscosity reducer that fluidizes the oil during rail transport to refineries in the south would allow full extraction of the oil from the tank cars and thereby reduce the number of cars required, effectively reducing cost and environmental and public impact.

Developing a diluent that can be used at lower volumes and with the same flow characteristics within a pipe means one can greatly increase efficiency of existing transportation systems. This would mean more room in the pipeline, fewer trucks on public roads, less environmental impact, and fewer train cars to ship the same volume of oil. Ultimately it could cause a dynamic shift in the way oil is priced.

SUMMARY OF THE INVENTION

The present inventors have found a hydrocarbon based fluid additive which reciprocally can be added to either condensate diluent or heavy oil, such as in situ or crude oils, to form a less viscous whole fluid. Reducing viscosity and reducing the amount of diluent used can enable greater transportation volumes within existing pipelines at specification, and can allow blocked pipeline lengths to be freed.

The additive makeup is a calculated ratio of short chain alkanes and volatile aromatic organic compounds formulated specifically to manipulate the alkane and aromatic compounds intermolecular interactions already present in the parent diluents and/or oil. A process of profiling the total alkane make up of both the heavy oil and the diluent condensate oil including density, viscosity, inorganic percentages and desired pipeline specification and/or viscosities are typically an integral experimental and mathematical part of implementing additives final formulation.

The present inventors have found specific formulations and corresponding stabilized blends have resulted from this evolution of understanding. These products are effective across a wide range of oil types. Formulations which are particularly useful do not contain benzene.

By utilizing a predictive viscosity calculation that takes into effect the densities of the parent heavy oil and specific light oil condensate diluent to be used the present inventors were able to predict and thereby experimentally determine an ideal alkane to volatile aromatic ratio necessary to maximize viscosity, while minimizing diluent use for heavy and condensate diluent oils. The present inventors were able to develop an active viscosity reducing benzene-free product.

Thus in preferred embodiments, the invention teaches a composition comprising pentane and hexane in a ratio of about 8:11, pentane:hexane.

The composition may further comprise xylene and/or toluene. It may be in a ratio of about 27-37:39-49:1-9, pentane:hexane:aromatics, or in a ratio of about 8:11:1, pentane:hexane:aromatics, or in a ratio of about 27-37:39-49:2-5:1-4, pentane:hexane:toluene:xylene, or in a ratio of about 32:44:3:1, pentane:hexane:toluene:xylene.

The composition may be in a ratio of about 27-37:39-49:1-9, pentane:hexane:aromatics, or in a ratio of about 8:11:1, pentane:hexane:aromatics, or in a ratio of about 27-37:39-49:1-2:1-2, pentane:hexane:toluene:xylene, or in a ratio of about 32:44:1:1, pentane:hexane:toluene:xylene.

The invention further teaches the use of these compositions as one or more of an oil additive, an oil diluent, to enhance oil viscosity, to decrease oil pipeline transport, as an oil vessel cleaner, to remove oil well plugs. It may be particularly useful with heavy oil. It may be particularly stable with a light oil condensate diluent.

DETAILED DESCRIPTION OF THE INVENTION

Figure 1:
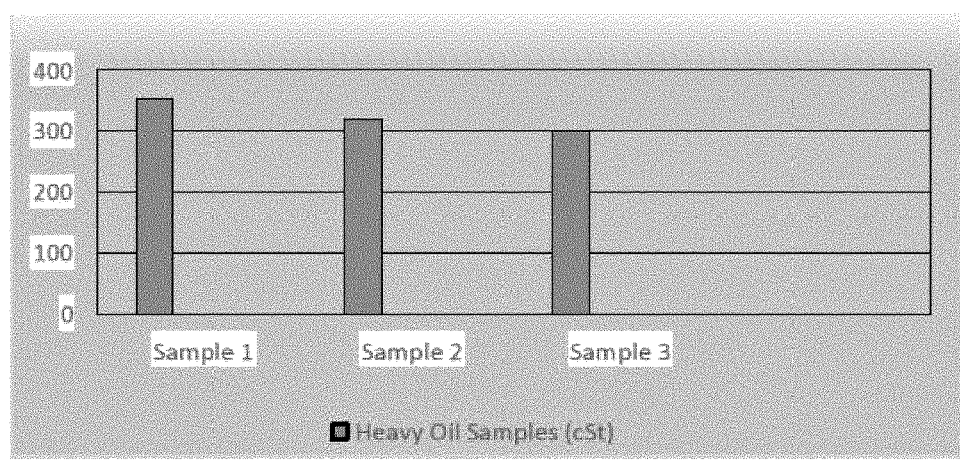
FIG. 1 is a chart showing a viscosity comparison of Product A treated heavy oil versus untreated.

This invention relates to enabling maximum amounts of heavy crude oil meeting pipeline specification to flow in pipelines from upstream production wells and facilities and intermediate processing facilities down to final refining facilities in all climatic temperatures with significantly less diluent. Alternatively or simultaneously the formulation could be used to prevent or open up pipeline systems with restricted flow due to oil viscosity caused by paraffins or asphaltene complexes.

The solution is to decrease the viscosity of crude and heavy oil so that it will flow in the pipe but not have to dramatically increase the volume of the oil. Light oils allow the crude to flow but they have changed in character over the past 15 years. By producing an additive that corrects diluent composition to the most advantageous composition for the current heavy oil it is possible to dramatically reduce the amount of diluent that is needed. The present inventors developed the best "additive" for diluents (condensate) that would reduce viscosity in crude oils. The idea was based in part on "like dissolves like", and give the viscous oils the same characteristics of the less viscous oils; long-term occupational study and analysis of field condensate light oils with like densities but differing viscosities; long term occupational studying of oils with like viscosities and differing densities and their effect on process equipment fouling. This led to the understanding of a pattern. Once this was determined, a group of ideal compounds could be identified. Viscosity and density calculations were thereby used in conjunction with this knowledge to reduce the necessity of large scale testing and predict possible formulation ratios. What the present inventors found was dramatic. There is a "perfect" ratio that makes a step change in the viscosity effect. With only a small addition of the right hydrocarbons the effectiveness of diluents can be improved. It was important that the additive be "natural" and contain compounds that would not harm or upset process equipment upstream, midstream or downstream. By using compounds the oils already contain the present inventors were able to preserve the natural state and bond interactions of the oil.

The chemical formulations were made by a combination of mathematical predictions of viscosity and density of a target blend and then by experimentally making several blends within that range, and finally by testing. As it happens, many of the heaviest oils have similar properties therefore the blend for oils with a density over 1010 have less variation than blends for lighter oils.

Example 1

Product A was formulated from typical grade chemical in an effort to make large scale manufacturing as cost effective and similar to experimental conditions as possible. It was specifically formulated to provide a safer less carcinogenic formula.

The following where used in the process of formulation:
Toluene: 99.9% Pure, Fisher Scientific
Xylene: Certified ACS 99.9% Pure, Fisher Scientific
Pentane: 98% Pure, Acros Organics
Hexane: 99.9% Honeywell B& J
The TX was made by 75 Toluene and 25 Xylene by volume in an ultra cold environment.
Pentane: 98% Pure, Acros Organics Density @ 15 C: 630.5 kg/m3/630.6 kg/m3 Viscosity @ 7.5 C: 0.43185 cST
Hexane: 99.9% Honeywell B& J Density @ 15 C: 673.5 kg/m3/674.0 kg/m3 Viscosity @ 7.5 C: 0.56474 cST

| COMPONENT | ACTUAL (g) |
| --- | --- |
| nC5 | 40.35 |
| nC6 | 56.10 |
| TX | 5.05 |
| TOTAL | 101.51 |

| Spec | Result | | MDL |
| --- | --- | --- | --- |
| Density | 668.20 | kg/m3 | |
| Viscosity | 0.50728 | cST | 0.1 |

Comments:
nC5 40.35 g+nC6 56.10 g+(75 Toluene/25 Xylene % by volume) 5.05 g
Methods:
Density (AP) ASTM D4052-11
Viscosity @ 7.5 deg C. ASTM D445

Example 2

Description

Peace River Heavy Oil with Product A

| Spec | Result | | MDL |
| --- | --- | --- | --- |
| Density | 916.70 | kg/m3 | |
| Viscosity | 214.90 | cST | 0.1 |

Comments:
PROS 39.7080 g+Product A 10.27 g
Methods:
Density (AP) ASTM D4052-11
Viscosity @ 7.5 deg C. ASTM D445

Example 3

Description

MO10

| Result Name | Result | | MDL |
| --- | --- | --- | --- |
| Density | 698.10 | kg/m3 | |
| Density | 699.20 | kg/m3 | |
| Viscosity | 0.50226 | cST | 0.1 |
| Viscosity | 0.50510 | cST | 0.1 |

Comments:
MO10-2: CRW 35.6139 g (lean oil condensate)+diluent 33.1946 g=68.8085 g
Methods:
Density ASTM D1298-99 (2005)
Density (AP) ASTM D4052-11
Viscosity @ 7.5 deg C. ASTM D445

This formulation reduced the use of diluent by between 8 and 18%. By adding the active ratio to the condensate it was meant to enhance we created a stable safe product. Considerations in this final preparation may include vapor pressure, flash point, shipping temperature, safety issues or any environmental concerns specific to the implementation.

The product reduces the 1015 kg/m$^3$ Peace River heavy oil (16557 cSt at 25 deg C.) to 930 kg/mg with a viscosity of 355 cSt (at 15 deg C.) with a 24 percent addition of typical[9] condensates containing the diluent. The diluent can reduce the viscosity by 70% with an addition of less than 12% product to the whole mixture. This means a pipeline could carry between 8-18% more oil and still have the same flow characteristics.

Benefits of the formulations include:
a. Decreases Viscosity of Heavy Oils
b. Decreases Density of Heavy Oils
c. Does not cause emulsions
d. Does not become inactive or molecularly breakup in the presence of heat or pressure.
e. Does not change the pH of the native Oil
f. Similarly noncorrosive as typical condensate (diluents)

When the diluent is added to oil "plugs" containing asphaltenes, paraffins and silicon, it breaks them apart (at ambient temperatures) turning them into a light oil that is easy to manipulate. By adding the diluent to specific condensates (lean oils) it is makes it into a universal oil solvent. In the gas and oil field it could be used to:

a. Free pipe structure in which oil has stopped flowing due to high density
b. Clean heavy oil (paraffins, asphaltenes, sulfur compounds, nitrogen compounds, chloride deposits) deposits from light oil systems for example stabilizer or facing towers and process vessels; universal vessel cleaner.
c. Can be utilized "down hole" to help free wells that have stopped flowing due to plugging in their upper structure due to hardening of paraffins and asphatenes.
d. Can be used as a "wash" to accelerate the removal of heavy oils from sand laden bitumens or as a agent to assist in the removal of waters from SAGD oils.

e. Can be used to fluidize or reduce the viscosity of raw heavy oils or semi processed heavy oils being transported by truck or rail tanker.

The diluent and MO10 can be used in concentrate to enable better smart pigging of heavy oil pipelines.

The additive accentuates the C4 to C10 behavior and character of condensate diluents and makes them more effective. By doing this, less diluent can be used and more oil can travel in a pipeline within the specific pipeline specification. The formulations alter the viscosity of heavy oils, bitumen and sludge oils such that they will flow. Accordingly, the formulations provide:

1. Increased oil in pipelines, which results in:
    a. Decreased carbon footprint in shipping oil in pipeline rather than rail or tuck.
        i. Cost benefit in that less diluents will need to be shipped to upstream terminals.
        ii. Cost benefit in that the efficiency of shipping has been increased.
    b. Decrease plugging or unplug lines in upstream, downstream and midstream. Saves money in downtime and makes money in increased production.
    c. Cost benefit in reduced diluents used
2. Cost benefit in reduced fouling due to "non-like" chemistry use
3. Public and company safety benefit in that there will be fewer trucks on populated highways and locations.
4. Public safety and company liability benefit as less oil is shipped overland by rail.
5. Reduced environmental risk due to less oil is shipped overland by rail.
6. Reduced cost as pipeline systems will hold more and not need additional pipelines and use of more compatible chemistries will extend pipeline life.
7. Reduced pipeline and process downtime due to more favorable and effective risk based assessment (less chemical warfare).
8. Improve pipeline safety by increasing effectiveness of smart pigging (reduced risk of pipeline failure due to better prevention).

The formulations also provide the following benefits:
1. They may be sold in MO10 form to increase stability.
2. Do not contain alcohols
3. Do not contain carbon disulfide, sulfurs or mercaptan
4. Do not contain ethers.
5. Do not contain polymers or DRAs
6. Do not contain phosphorus or volatile phosphorus
8. Do not need to adjust the pH or affect the corrosion properties of diluents (not an acid or a base)
9. Is not an emulsifier or does not by itself cause emulsions with pure hydrocarbon oil.

Example 4

Full Scale 100 bbl Test

A commercial scale test was carried out, including independent verification of test samples.

Test Methodology

A. Transport Product A to site in 210 L (approximately 1.67 barrels) drums. Premix of Product A as done on site.
B. A 16 m$^3$ (approximately 100.64 bbl @ 15° C.) tri-axle load of heavy oil was transported to site at 80° C. Initial samples were taken using a mid-stream technique.
C. An 8 m$^3$ (approximately 50.3 bbl @ 15° C.) truck of condensate diluent was transported to site. Initial samples were taken using a mid-stream technique.
D. Basic density measurements were taken of the fluids that arrived on site to ensure hydrocarbons were similar in makeup to the fluids used in pretesting.
E. 2.36 m$^3$ (approximately 14.84 bbl @ 15° C.) of condensate diluent was pumped into a separate tank.
F. Environment temperature at this point was 10.3° C. (Temperature, pressure and wind direction where monitored during the day).
F. To the original condensate tank 1560 kg (approximately 13 barrels) of Product A was added. After mixing a contact time of 20 min was allowed to ensure Product A was active within the condensate. Samples were taken to be assured that the density marker had been achieved.
G. The condensate with infused Product A was pumped onto the oil tanker.
H. The oil tanker then circulated its load using its own pumps from front to back. This was chosen to ensure mixing due to the baffle design of the tank truck.
I. After a mixing time of 10 minutes, heavy oil samples were pulled at 2 min intervals from a mid-truck sample point again using a mid-stream technique.
J. After completion of the field test, post laboratory testing confirmed that the oil was in fact within pipeline specification.

Sampling Procedure

All samples were taken in a consistent manner.
A. A 1 liter polycarbonate sample container was used for all samples.
B. All samples were taken mid-stream, meaning that the sample fluid was allowed to flow from the sample point for a short time into a waste vessel and then a sample was taken.
C. Samples were shipped in bursts to the PFL laboratory and placed in a sub-zero freezer. All jug samples were taken full to the top and handled without shaking.

Analytical Procedures

1. All densities were done by Anton Par Density meter. Density (AP) ASTM D4052-11
2. All temperatures were taken by mean of a calibrated certified thermometer.
3. Absolute Density at 15 degree C. ASTM D5002
4. Flash Point (Closed Cup) ASTM D3228, ASTM D93 & EPA 1020B
5. Reid Vapor Pressure (RVP)-Condi ASTM D323-08, ASTM D323A
6. Viscosity @ 7.5, 15, and 40° C. ASTM D445
7. Pour Point ASTM D58

Lab Scale Model Tested (in the Beaker)

|  | Lab Scale (ml) | Lab Scale (g) | Lab Scale % Volume | Lab Scale % Weight |
| --- | --- | --- | --- | --- |
| Condensate | 6.10 ml | 4.40 g | 11.39% | 8.91% |
| Product A | 6.19 ml | 4.05 g | 11.39% | 8.19% |
| Heavy Oil | 41.34 | 40.97 g | 77.22% | 82.90% |
| Viscosity | 322 cSt | 322 cSt | 322 cSt | 322 cSt |

Field Scale Model (350 cSt at 7.5 deg C.)

|  | Field Scale (m3) | Field Scale (kg) | Field Scale % Volume | Field Scale % Weight |
| --- | --- | --- | --- | --- |
| Condensate | 2.35 m3 | 1701.95 kg | 11.35% | 8.90% |
| Product A | 2.36 m3 | 1666.17 kg | 11.39% | 8.19% |

-continued

|  | Field Scale (m3) | Field Scale (kg) | Field Scale % Volume | Field Scale % Weight |
|---|---|---|---|---|
| Heavy Oil | 16.00 m3 | 15853.44 kg | 77.26% | 82.91% |
| Viscosity | 322 cSt | 322 cSt | 322 cSt | 322 cSt |

Density differential in Lab Scale Product as vs Field Scale Constituents

| Land Mark Values | Lab Scale test | Full Scale test. | Differential | % Error |
|---|---|---|---|---|
| Density Product A/Condi Blend | 964.4 kg/m³ | 964.2 kg/m³ | 0.2 kg/m³ | 0.02% |
| Density of Condensate | 777.4 | 724.60 | 52.8 kg/m³ | 7.29% |
| Density of Heavy Oil | 991.4 | 990.80 | 0.6 kg/m³ | 0.06% |

Final Combined Product A Results Table
Analysis of Final Product A Oil

| Test | Result | Goal | Pipeline spec. | Within spec. |
|---|---|---|---|---|
| Density $^P$ | 967.50 kg/m³ | 964.4 |  | YES |
| Density $^P$ | 965.20 kg/m³ | 964.4 |  | YES |
| Flash Point $^M$ | 42.5 |  |  |  |
| Viscosity $^P$ | 352.8 cSt | 315-350 cSt |  | YES |
| Viscosity $^P$ | 318.8 cSt | 315-350 cSt |  | YES |
| Viscosity $^P$ | 293.2 cSt | 315-350 cSt |  | YES |
| Viscosity (Average) | 321 cSt | 315-350 cSt | <35 kpa | YES |
| Reid Vapor Pressure $^M$ | 6.1 kpa | <35 kpa | <35 kpa | YES |
| Pour Point $^M$ | −9.0 deg C. |  |  | YES |

N.B.
$^P$—PFL Result
$^M$—Maxxam Result

FIG. 1 shows a viscosity comparison of Product A treated heavy oil versus untreated heavy oil.

CONCLUSION

When prior laboratory results were compared with final full scale Product A data the congruence exceeded test expectations. Error on the condensate/Product A composite Product A showed only a 0.2% error differential between that of the expected value and the field test large scale result.

Figure 2:
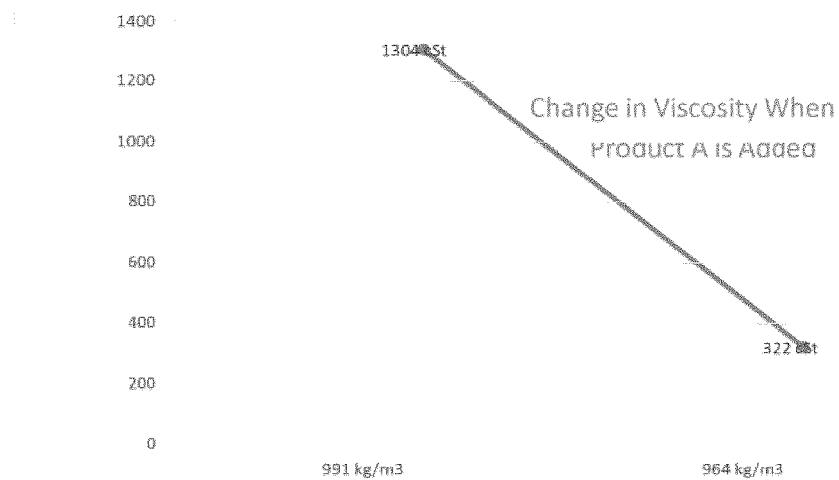
FIG. 2 is a graph showing the change in viscosity when Product A was added.

FIG. 2 is a graph showing the change in viscosity when Product A was added.

Accordingly the final viscosity was correct according to pre-test calculations. A target of 322 cSt was used in the Product A model and results were between 293-352 cSt. Evidence from this test suggests that neither increased heat nor water content have a significant effect on performance. The prevalent SAGD and conventional instillations use between 33% and 36% condensate or diluent. The engineered diluent has been shown to clearly reduce condensate usage from the typical 36% to that of 17% (9% Condensate Diluent+8% Product A). Clearly, a reduction of this amount of condensate in a pipeline will allow additional room for the real commodity-oil.

Figure 3:
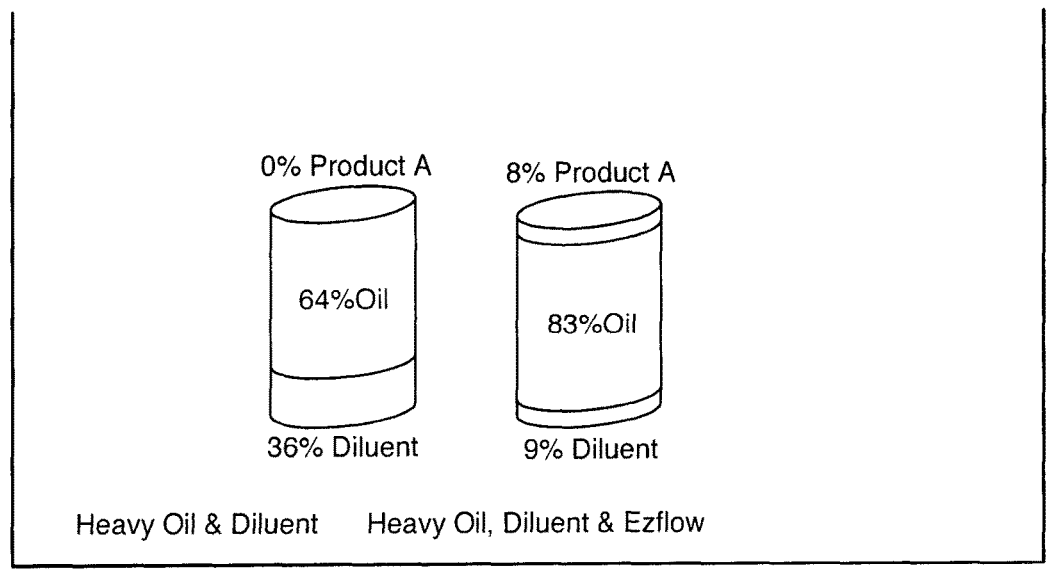
FIG. 3 is a diagram showing improved efficiency when Product A is added to condensate.

FIG. 3 shows the improved efficiency when Product A is added to condensate, from the field study with 991 kg/m³ heavy oil.

Another positive observed in the test result was the ability to infuse Product A into hot oil at 39-47° C. without perceptual loss. Another clear "on site indicator" was the marked reduction in friction and effort needed to pump the less viscous oil. This demonstrated that using the Product will reduce pumping costs. In addition to reduced pumping costs, the advantage of fully empty trains will reduce the overall environmental footprint of oil processing. In summary, the field test is a success that proves clearly that the invention is scalable.

The field test clearly achieved the following objectives:
The large scale test proved to be an accurate representation of laboratory testing with only a 0.2% differential. This close correlation clearly demonstrates the processes scalability. In fact, scalability was so relative it is not practical to develop trends or survey to address the differential. No limits in scalability were experienced in this field test.
Practical difficulties were not evident but practical advantages like clean hoses after the truck-to-truck transfer were observed.
The predictability of Product A was established with values for all oil specifications being attained in expected ranges.
Product A was tested over a greater temperature range than expected without difficulty. It also performed well in pumps under pressure.
Product A performed without incident in pumps, trucks, piping, meters and vessels.

We claim:

1. An oil additive product for decreasing the viscosity of oil to enhance oil transport, the oil additive product comprising pentane and hexane in a ratio of 8:11, pentane:hexane.

2. The oil additive product of claim 1, further comprising an aromatic.

3. The oil additive product of claim 2, wherein said aromatic comprises one or more of xylene and toluene.

4. The oil additive product of claim 2 comprising pentane, hexane and an aromatic, in a ratio of 27-37:39-49:1-9, pentane:hexane:aromatic.

5. The oil additive product of claim 4 comprising pentane, hexane, toluene and xylene, in a ratio of 27-37:39-49:2-5:1-4, pentane:hexane:toluene:xylene.

6. The oil additive product of claim 4 comprising pentane, hexane, toluene and xylene, in a ratio of 27-37:39-49:1-2:1-2, pentane:hexane:toluene:xylene.

7. A method for using the oil additive product of claim 1, the method comprising one or more of:
applying the oil additive product as an oil additive;
applying the oil additive product as an oil diluent;
applying the oil additive product as an oil vessel cleaner;
applying the oil additive product to remove oil well plugs; and
applying the oil additive product to decrease oil density.

8. The method of claim 7, wherein said oil additive product further comprises an aromatic.

9. The method of claim 8, wherein said aromatic comprises one or more of xylene and toluene.

10. A method for using an oil additive product for decreasing oil viscosity to enhance oil pipeline transport, said oil additive product comprising pentane, hexane, and an aromatic, wherein said oil additive product is in a ratio of 27-37:39-49:1-9, pentane:hexane:aromatic, the method comprising one or more of:

applying the oil additive product as an oil vessel cleaner;
applying the oil additive product to remove oil well plugs; and
applying the oil additive product to decrease oil density.

11. A method for using an oil additive product for decreasing oil viscosity to enhance oil pipeline transport, the oil additive product comprising pentane, hexane, toluene, and xylene, wherein said oil additive product is in a ratio of 27-37:39-49:2-5:1-4, pentane:hexane:toluene:xylene, the method comprising one or more of:
applying the oil additive product as an oil vessel cleaner;
applying the oil additive product to remove oil well plugs; and
applying the oil additive product to decrease oil density.

12. The method of claim 7 wherein said oil additive product further comprises a light oil condensate diluent.

13. The method of claim 7 wherein said oil is a heavy oil.

14. Use of an oil additive product for decreasing oil viscosity to enhance oil pipeline transport as an oil vessel cleaner, to remove oil well plugs, or to decrease oil density, the oil additive product comprising pentane and hexane in a ratio of 8:11, pentane:hexane.

\* \* \* \* \*